United States Patent [19]

Westfall et al.

[11] Patent Number: 4,763,218

[45] Date of Patent: * Aug. 9, 1988

[54] VIDEO TAPE CASSETTE WITH INTERNAL TAPE ERASING MEANS

[76] Inventors: Wade H. Westfall; Roy Wheaton, both of P.O. Box 1485, Piqua, Ohio 45356; Alan F. Meckstroth, 2310 Far Hills Ave., Dayton, Ohio 45419

[*] Notice: The portion of the term of this patent subsequent to Apr. 21, 2004 has been disclaimed.

[21] Appl. No.: 40,226

[22] Filed: Apr. 20, 1987

Related U.S. Application Data

[63] Continuation-in-part of Ser. No. 725,423, Apr. 22, 1985, Pat. No. 4,660,116, which is a continuation-in-part of Ser. No. 713,300, Mar. 18, 1985, Pat. No. 4,660,115.

[51] Int. Cl.⁴ .............................................. G11B 23/02
[52] U.S. Cl. .................................. 360/132; 242/199; 360/66
[58] Field of Search .......................... 360/132, 66, 118; 242/199; 206/387

[56] References Cited

U.S. PATENT DOCUMENTS

| | | | |
|---|---|---|---|
| 4,466,584 | 8/1984 | Chevalier et al. | 360/132 X |
| 4,482,104 | 11/1984 | Saito | 360/132 X |
| 4,488,644 | 12/1984 | Wynalda | 206/387 |
| 4,501,359 | 2/1985 | Yoshizawa | 206/387 |
| 4,660,115 | 4/1987 | Westfall et al. | 360/132 |
| 4,660,116 | 4/1987 | Westfall et al. | 360/132 |

Primary Examiner—Stuart N. Hecker
Assistant Examiner—David J. Severin
Attorney, Agent, or Firm—Jacox & Meckstroth

[57] ABSTRACT

A video tape cassette includes a case or housing formed by upper and lower mating case sections of molded plastics material. A tape supply reel and a take-up reel are supported for rotation within the housing, and a prerecorded magnetic tape is wound onto the supply reel. The leading end portion of the tape extends around guide rollers along a predetermined path to the take-up reel, and a tape erasing element or magnet is supported within the housing to erase the prerecorded material from the tape as it is wound onto the take-up reel and thereby provide for only one time viewing of the prerecorded material. The internal tape erasing element may be made ineffective to provide for original recording of the material on the tape and may be made ineffective after the one time viewing so that the cassette may be reused by the purchaser as a blank cassette. The cassette may also be constructed as a disposablle cassette, and other means may be incorporated to provide for only one time viewing of the material.

9 Claims, 2 Drawing Sheets

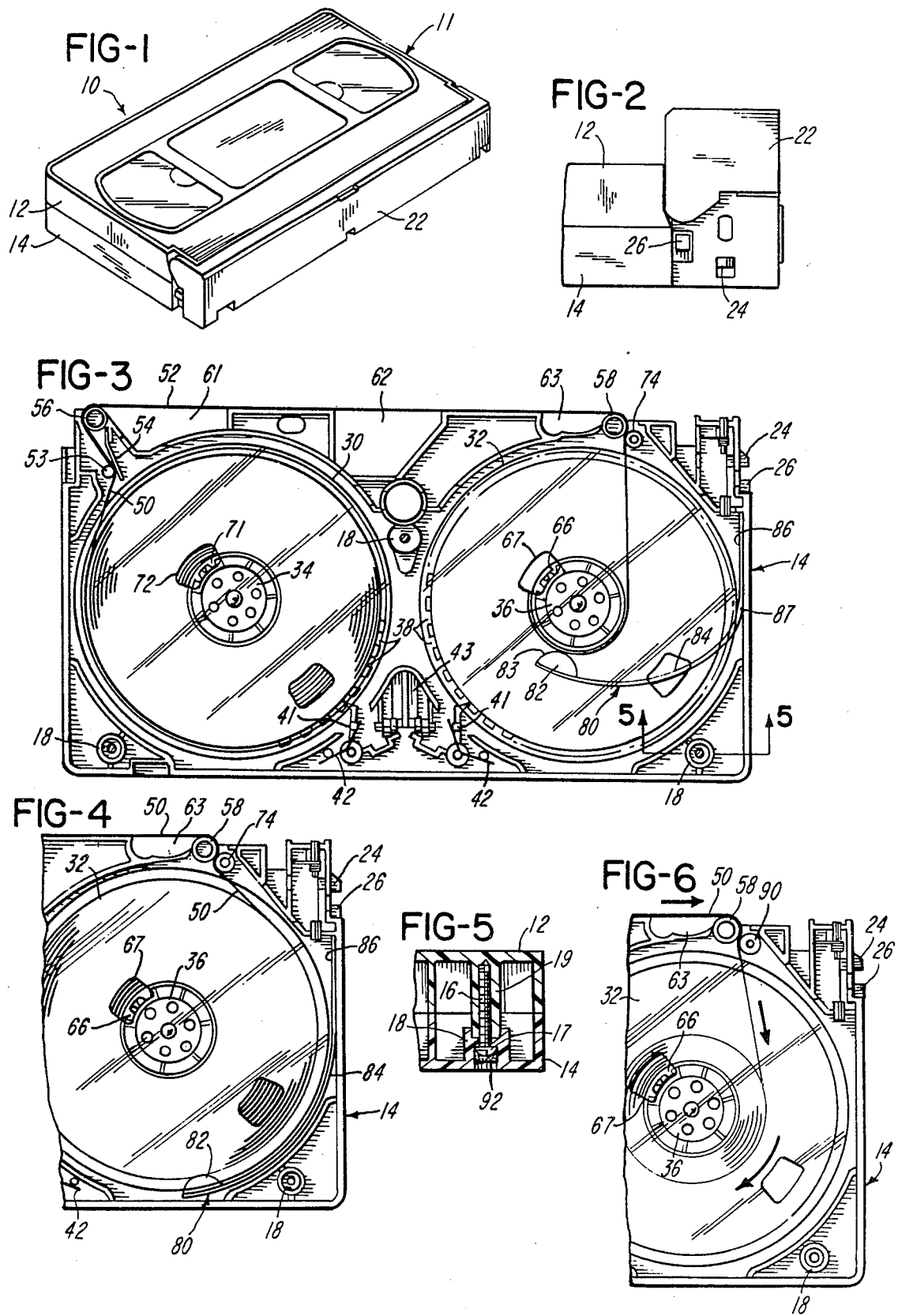

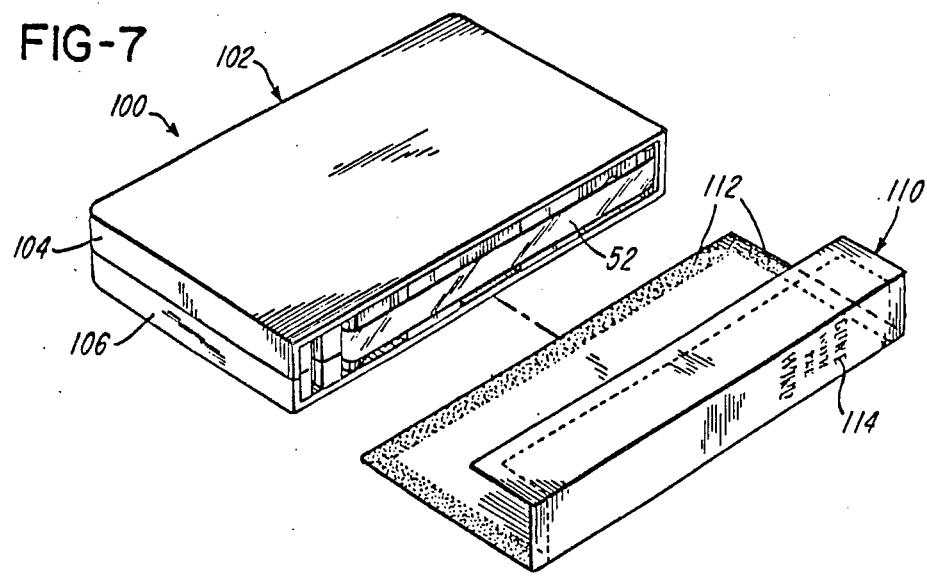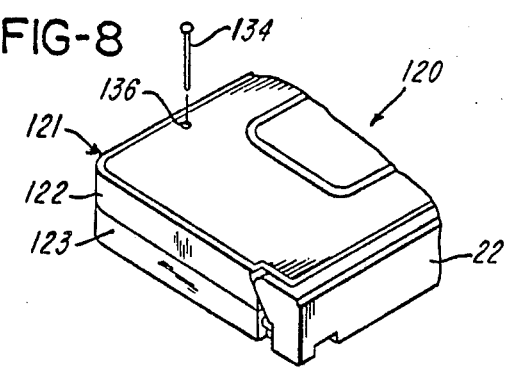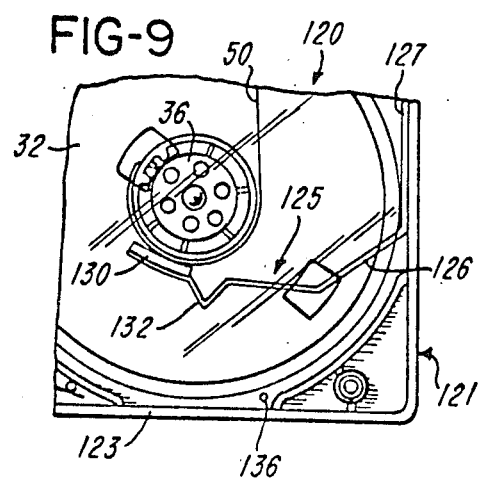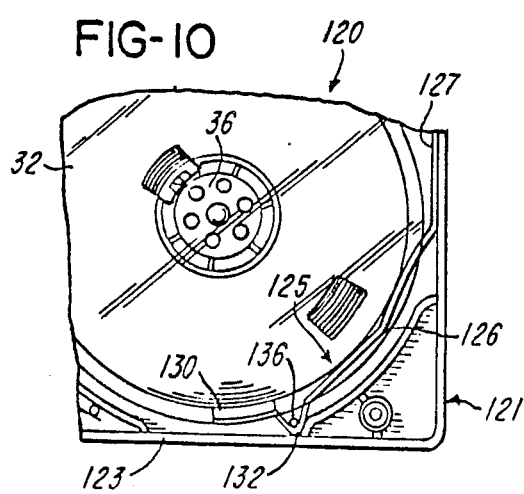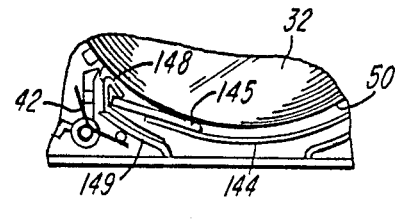

VIDEO TAPE CASSETTE WITH INTERNAL TAPE ERASING MEANS

RELATED APPLICATION

This application is a continuation-in-part of application Ser. No. 725,423, filed Apr. 22, 1985, U.S. Pat. No. 4,660,116, which is a continuation-in-part of application Ser. No. 713,300, filed Mar. 18, 1985, U.S. Pat. No. 4,660,115.

BACKGROUND OF THE INVENTION

In the art of video cassette recorders using either the VHS or BETA format, it is common for owners of the recorders and players to rent video tape cassettes having prerecorded video programs or materials such as a variety of movies. Usually, the cassette rental stores purchase the prerecorded tape cassettes either directly or indirectly from the owners of the programs or materials such as from motion picture studio companies. It is not uncommon for a rental store to rent a video tape cassette with prerecorded material to dozens of customers each of whom may pay from $1.00 to $4.00 per day for renting the prerecorded video tape cassette. While cassette rental customers have the option to purchase a prerecorded tape cassette at a price, for example, between $30.00 and $70.00, it has been found that most customers desire to rent a prerecorded tape cassette for a short period of time. After the rental period, the prerecorded tape cassette is returned to the rental store.

A dispute has arisen between the copyright owners of prerecorded programs or materials and the owners of the video tape cassette rental stores. The owners of the copyrights believe they should receive a copyright royalty from the owner of a rental store whenever a prerecorded recorded video tape cassette is rented to a customer. However, the existing U.S. Copyright Act of 1976 does not provide for any such payment. Thus substantial time, money and effort has been expended towards convincing the United States Congress that the Copyright Act requires an amendment to provide for payment of a copyright royalty whenever a tape cassette is rented with prerecorded copyright material. In this manner, the amount of use of prerecorded material would be reflected in the amount of payment of copyright royalties.

SUMMARY OF THE INVENTION

The present invention is directed to an improved video tape cassette which is ideally suited for marketing prerecorded copyright programs or materials such as motion pictures, and which substantially reduces or eliminates the problem or dispute described above. The video tape cassette of the invention incorporates internal means such as tape erasing means which provide for one time use or viewing of the material prerecorded on the video tape after which the material is automatically erased. Thus, the video tape cassette of the invention provides for marketing and selling prerecorded and sealed tape cassettes of copyright materials directly to consumers or owners of video cassette recorders, thus eliminating the need to rent the cassettes. For example, the video tape cassette of the invention enables a copyright owner of a motion picture to sell a copy of the motion picture to a consumer at a price not much greater than the consumer pays for renting a cassette prerecorded with the motion picture plus the price of a blank cassette. The substantial increase in the volume of sales by the copyright owners of the prerecorded materials enables the copyright owners to reduce the selling prices of the copyright materials to only a few dollars, especially if the self-erased tape cassettes are constructed as disposable cassettes or for subsequent use as blank cassettes or are returned to the distributing store for a deposit return in a manner similar to the deposit return for returnable bottles which contain soft drinks.

In general, a video tape cassette is constructed in accordance with one embodiment of the invention by supporting within a sealed cassette case or housing a tape erasing head or magnetic element which contacts the outer surface of the magnetic tape and disables or erases the prerecorded material as the tape is wound onto the take-up reel within the housing. In one form of this embodiment, the erasing head or magnet is supported for movement within the take-up reel by a thin flexible plastic strip which forms an arm having one end portion secured by adhesive to the inner surface of the case or housing. The magnet and arm may be retained in a retracted ineffective position during prerecording and also after the one-time viewing so that the cassette may be reused as a blank cassette. In another embodiment, one of the tape guide rollers within the cassette housing and contacting the coated surface of the tape is formed as a permanent magnet and is located adjacent the take-up reel, and in a further embodiment, the cassette is completely disposable and constructed to provide for only one time clear viewing of the prerecorded material.

Other features and advantages of the invention will be apparent from the following description, the accompanying drawings and the appended claims.

BRIEF DESCRIPTION OF THE DRAWINGS

FIG. 1 is a perspective view of a prerecorded video tape cassette constructed in accordance with the invention;

FIG. 2 is a fragmentary elevational view of the cassette shown in FIG. 1 and illustrating the tape protector cover in its upper retracted position while the tape cassette is being used in a tape recorder;

FIG. 3 is a plan view of the tape cassette shown in FIG. 1 with the upper case section removed to show an internal tape erasing means according to one embodiment and prior to using the tape cassette;

FIG. 4 is a fragmentary plan view of a portion of the cassette shown in FIG. 3 and illustrating the position of the tape erasing means after the tape cassette is completely used and erased;

FIG. 5 is a fragmentary section taken generally on the line 5—5 of FIG. 3;

FIG. 6 is a fragmentary plan view similar to FIG. 4 and illustrating another form of internal erasing means constructed in accordance with the invention;

FIG. 7 is a perspective, partially exploded view of a disposable video cassette constructed in accordance with another embodiment of the invention;

FIG. 8 is a fragmentary perspective view of a further embodiment of a video cassette constructed in accordance with the invention;

FIGS. 9 and 10 are fragmentary sections of the cassette shown in FIG. 8; and

FIG. 11 is a fragmentary section showing another embodiment of the invention.

DESCRIPTION OF THE PREFERRED EMBODIMENTS

FIG. 1 illustrates a VHS video tape cassette 10 constructed in accordance with the invention and including a case or housing 11 formed by an upper case section 12 and a lower case section 14 each of which is injection molded of a rigid plastics material. The mating case sections 12 and 14 are arranged in opposing relation and are rigidly secured together by a series of threaded fasteners 16 (FIG. 5) each having a head 17 recessed within a cylindrical cavity defined by a tubular portion 18 molded as an integral part of the bottom case section 14. Each fastener or screw 16 is self-threaded into a tubular portion 19 molded as an integral part of the upper case section 12. The head 17 of each screw 16 has a single direction slot with diametrically opposed cam surfaces so that each screw 16 may be tightened with a conventional screwdriver but not released or removed with the screwdriver.

The cassette 10 also includes a tape cover section 22 which is molded of a rigid plastics material and is supported by the upper case section 12 for pivotal movement between a lower tape covering position (FIG. 1) and an upper retracted (FIG. 2) position. In a conventional manner, the cover section 22 is retained in its lower position by a latch element 24 (FIG. 2) which is released when the video cassette 10 is inserted into a video cassette recorder (VCR) and a member in the recorder depresses a latch release buttom 26. The cover section 22 is then pivoted to its upper retracted position as shown in FIG. 2.

As shown in FIG. 3, the cassette housing 11, formed by the case sections 12, 14 and 22, encloses a transparent spool-like circular tape supply reel 30 and an identical circular take-up reel 32. The reels have corresponding hollow hubs 34 and 36 and are supported for limited lateral movement as well as for rotation on parallel axes. The bottom wall or flange of each reel has peripherally spaced notches 38, and the notches receive corresponding V-shaped and pivotally supported ratchet pawls 41. The pawls 41 are pivoted against torsion springs 42 to retracted positions when the cassette 10 is inserted into a tape recorder by a member which engages a pivotally supported release actuator 43. The ratchet pawls 41 prevent undesirable rotation of the reels 30 and 32 until the cassette 10 is inserted into a tape recorder.

A prerecorded magnetic tape 50 is wound on the supply reel 30, and a leading end portion 52 of the tape 50 is directed between a post 53 and a tape tension leaf spring 54 and then around a metal guide roller 56 to a metal guide roller 58. The rollers 56 and 58 are rotatably supported by pins molded as integral parts of the case sections 14. The leading end portion 52 of the tape 50 extends along a straight path which is established by the rollers 56 and 58 and crosses over cavities or recesses 61, 62 and 63 formed within the case sections 12 and 14. When the cassette 10 is inserted into a video cassette recorder, the recesses or cavities 61, 62 and 63 receive rollers or elements (not shown) which pull the leading end portion 52 of the tape 50 into the recorder and around the cylindrical recording and playing head (not shown).

As also shown in FIG. 3, the leading end portion 52 of the tape 50 extends from the guide roller 58 to the hub 36 of the take-up reel 32. The end portion is secured to the hub 36 by wrapping the end portion around a removable hub segment 66 inserted into the hub 36 through a window or opening 67 within the take-up reel 32. In a similar manner, the trailing end portion of the tape 50 is attached or connected to the hub 34 of the supply reel 30 by a hub segment 71 inserted into the hub 34 through a window or opening 72. A plastic guide roller 74 (FIG. 3) is supported for rotation by a pin molded as an integral part of the lower case section 14 and is located adjacent the guide roller 58. The guide roller 74 contacts the outer surface of the tape 50, and this is the surface which has the magnetizable coating with the magnetically prerecorded material.

In accordance with the present invention, magnetic tape erasing means 80 are located within the housing 11 between the case sections 12 and 14 for progressively erasing the prerecorded material on the tape 50 as the tape is wound onto the take-up reel 32. In the embodiment shown in FIGS. 3 and 4, the tape erasing means 80 includes a part cylindrical permanent magnet 82 having a smooth outer surface 83 forming line contact with the outer coated surface of the tape 50. The magnet 82 is adhesively attached to one end portion of a curved arm 84 formed by a strip of thin flexible plastics sheet material. The strip or arm 84 has an opposite end portion 86 which is attached by adhesive to the adjacent end wall of the lower case section 14. The arm 84 extends into the reel 32 and flexes at 87.

The arm 84 has a radius of curvature generally the same as the radius of the outer cylindrical surface of the take-up reel 32. The arm 84 exerts a predetermined force by the magnet 82 against the outer surface of the tape 50 as the tape is wound onto the take-up reel 32. When the tape 50 is completely unwound from the supply reel 30 and fully wound onto the take-up reel 32, the flexible arm 84 and the magnet 82 are positioned as shown in FIG. 4 where the magnet 82 continues to contact the outer coated surface of the tape 50. The strength of the magnet 82 is selected so that it effectively erases the prerecorded material on the tape 50 as the tape winds onto the pick-up reel 32 but is sufficiently low so that the magnet 82 does not effect the prerecorded material on the supply reel 30.

Referring to FIG. 6 which illustrates another embodiment of internal magnetic tape erasing means in accordance with the invention, a tape guide roller 90 is constructed of a permanently magnetized material and replaces the molded plastic guide roller 74 referred to above in connection with FIG. 3. The magnetic roller 90 contacts the outer coated surface of the prerecorded tape 50 and is effective to erase the prerecorded material from the tape as the tape winds onto the take-up reel 32. Thus the magnetic erasing roller 90 functions as an internal erasing means in the same manner as the flexible arm and magnet 82 which are supported for movement within the take-up reel 32.

As mentioned above, the single direction fasteners or screws 16 secure the case sections 12 and 14 together, and the one way heads 17 of the screws prvent simple removal of the screws 16 for access to the internal tape erasing means. As further prevention to simple removal of the screws 16, each of the heads 17 is potted within the corresponding tubular portion 18 of the housing section 14 by an epoxy material 92. Thus a special tool is required to remove the epoxy material 92 and to rotate the screw 16 counter-clockwise in order to remove the screws and open the case or housing 10. This form of sealing the housing 11 prevents a user from easily removing the tape erasing means so that the prerecorded material is not erased and can be replayed.

FIG. 7 illustrates another video tape cassette 100 constructed in accordance with the invention and including a case or housing 102 formed by a first or upper case section 104 and a mating second or lower case section 106 constructed similar to the case sections 12 and 14 described above but without any windows in the upper section 104. The housing 102 encloses a supply reel 30 and a take-up reel 32, and a prerecorded magnetic tape extends from the supply reel to the take-up reel with a straight or linear portion 52 in the same manner as the prerecorded magnetic tape 50. The housing sections 104 and 106 are each molded of a relatively inexpensive plastics material which may be of high density rigid foam construction since the cassette 100 is intended to be disposable after one-time viewing of the prerecorded material on the tape 50. The material is automatically erased when it is rewound on the take-up reel 32 by means of an internal tape erasing means such as the erasing means 80 or 90 described above in connection with FIGS. 3–6.

In order to minimize construction and assembly costs of the cassette 100, the pivotal molded plastic dust cover 22 is omitted along with the windows within the upper case section. In place of the pivotal dust cover, the linear tape portion 52 is covered and protected by a thin plastic cover or paper label 110 which extends or wraps around the partially open edge of the cassette 100, the label 110 has a border with adhesive coating strips 112 for attaching the cover label to the housing 102 to provide a sealed closure for the cassette 100. The label 110 carries printed information 114 which identifies the prerecorded material on the tape within the cassette 100, and the lower portion or flange of the label 110 extends inwardly by a sufficient distance to cover the openings within the bottom wall of the case section 106 including the circular openings which receive hub portions of the reels 30 and 32.

Thus, the label 110 provides a complete dust-proof and tamper-proof seal for the cassette 100 and is only removed when it is desired to use the cassette 100 for the one-time viewing of the prerecorded material. Since the label 110 is effective to seal the cassette 100 and prevent any dust from entering the housing 102, the cassette 100 does not require any further packaging such as the conventional booklike plastic enclosure or a cardboard shipping box which is used for closing the bottom openings within the lower case section 106.

Referring to FIGS. 8–10 which illustrate a cassette 120 constructed in accordance with another embodiment with the invention, a housing 121 is constructed substantially the same as the housing 11 described above in connection with FIGS. 1–5 except without the transparent plastic panel forming the top window over the take-up reel 32. The housing 121 includes an upper case section 122 and a lower case section 123, and the cassette is ideally suited for sale of prerecorded material for one-time viewing during which the material is erased and after which the cassette may be reused as a blank cassette.

The internal tape erasing means 125 within the cassette 120 is constructed similar to the internal tape erasing means 80 described above and includes a flexible spring-like arm 126 which is formed from a thin strip of flexible spring-like plastics material. The arm 126 has an end portion 127 which is cemented or bonded to the end wall of the lower housing or case section 123, and the outer end portion of the arm 126 supports a rectangular pad-like permanent magnet 130 which normally contacts and rides upon the outer surface of the prerecorded magnetic tape 50 connected to the hub 36 of the take-up reel 32.

An intermediate portion of the arm 126 includes a U-shaped or V-shaped portion 132 which moves to a position adjacent the rearward edge of the housing 121 (FIG. 10) when the magnetic tape 50 is entirely erased by the magnet 130 and fully wound upon the take-up reel 32. After the flexible support arm 126 is shifted or moved to the fully erased position shown in FIG. 10, the arm 126 is retained or latched in the fully erased position by means of a pin 134 (FIG. 8) which extends through aligned holes 136 within the case sections of the housing 121 and within the V-shaped portion 132 of the arm 126.

When the cassette 120 is being manufactured or produced, the arm 126 of the internal erasing means 125 is manually retracted within the take-up reel 32 to the position shown in FIG. 10, and the pin 134 is extended upwardly through the hole 136 within the lower case section 123 of the housing 121 so that the arm 124 is locked in its fully retracted position relative to the take-up reel 32. The upper case section 122 is then assembled, and the fasteners or screws 116 (FIG. 5) are inserted after which the heads 17 are potted by the material 92 so that the housing 121 is sealed. While the arm 126 is held in its retracted position so that the erasing head or magnet 130 is inoperative or ineffective, the magnetic tape 50 is recorded with the prerecorded copyright material and then rewound onto the supply reel 30. The pin 134 is then retracted from the bottom hole 136 so that the arm 126 and magnet 130 shift to the self-erasing position shown in FIG. 9 due to the spring effect of the arm.

The cassette 120 with the prerecorded material on the magnetic tape 50 is sold to the end user or consumer as a one-time or single view prerecorded cassette. After the one-time viewing of the prerecorded material when the tape 50 is fully wound on the takeup reel 32, the user of the cassette 120 may reinsert the pin 134, which is carried with the cassette 120, into the top hole 136 of the housing 121 to lock the arm 126 and the internal tape erasing means 125 in their retracted positions. The cassette 120 may then be reused by the customer over and over again as a blank cassette. Thus it is unnecessary for the consumer to dispose of the cassette such as done with the cassette 100 shown in FIG. 7 or to return the erased cassette for a deposit return such as described above in connection with the cassette 10. It is also within the scope of the invention to replace the retractable latch pin 136 with a U-shaped latch pin (not shown) or element rotatably supported by the edge wall of the case section 123. The U-shaped latch element is manually pivoted 90° after the arm 126 or similar arm moves to its fully retracted position as shown in FIG. 10 for retaining the arm.

In place of using the latch pin 134 shown in FIG. 8 or the rotatable latch pin or element to retain the magnet support arm 126 in its fully retracted and ineffective position for reusing the video cassette as a blank cassette, the arm and erasing magnet may be automatically latched when the erased tape 50 is fully wound on the take-up reel 32. For example, as shown in FIG. 11, a thin spring plastic arm 144 and erasing magnet 145 are retained by a spring plastic clip 148 which is attached or cemented to a wall 149 of the lower case section 123. When the pad-like erasing magnet 145 is shifted or moved outwardly towards its fully retracted position shown in FIG. 12 while viewing the material, the outer end portion of the magnet 145 flexes a thin spring plastic hook or clip 148 and snaps under the clip which permanently retains the magnet in its retracted position.

From the drawings and the above description, it is apparent that a video tape cassette constructed in accordance with the invention, provides desirable features and advantages. As mentioned above, the cassette 10 or 100 or 120 permits the owner of copyright material, such as a movie, to prerecord the material on the tape 50 wound onto the supply reel 30 within the cassette and then sell the cassette to a consumer having a video cassette recorder. The copyright material is played once by the consumer and is then automatically erased by the tape erasing means within the cassette. Thus the owner of the copyright material recorded on the cassette does not have to be concerned that the copyright material will be reused by a third party or rented multiple times by a rental store. As a result, the copyright owner obtains a substantial increase in the volume of sales of the copyright material, and this permits a substantial reduction in the selling price of each prerecorded cassette.

As another feature, the cassette 120 may be reused as a blank cassette after the prerecorded material is automatically erased simply by inserting the pin 134 into the holes 136 and into the V-shaped portion 132 of the arm 124 after the erased tape 50 is fully wound on the take-up reel 32. While the pin 134 forms an effective and simple releasable latch means for the internal erasing means, it is within the scope of the invention to use other forms of latches such as the spring-like hook or latch 148 or Velcro material. As also described above, the videocassettes with prerecorded material may be constructed and sold as disposable cassettes or with a deposit for each cassette. The deposit is returned to the purchaser when the erased cassette is returned to the retail store from which the cassette is purchased.

While the invention is described above in connection with a VHS cassette, it is to be understood that the internal tape erasing means of the invention may also be used in connection with any prerecorded videocassette including a BETA cassette or 8 m.m. cassettes. Furthermore, while the forms of cassettes with internal tape erasing means or one direction take-up reel herein described constitute preferred embodiments of the invention, it is to be understood that the invention is not limited to the precise form described, and that changes may be made therein without departing from the scope and spirit of the invention as defined in the appended claims.

The invention having thus been described, the following is claimed:

1. A video tape cassette adapted to be inserted into a videocassette recorder and to be removed from the recorder, said cassette comprising a housing defining a generally enclosed chamber, a supply reel and a take-up reel each having a hub portion and supported within said chamber for rotation on parallel spaced axes, a flexible magnetic tape having prerecorded information thereon, said tape being wound on said hub portion of said supply reel and having a leading end portion connected to said hub portion of said take-up reel, means supported by said housing for guiding said tape from said supply reel to said take-up reel and along a predetermined path, tape erasing means disposed within said chamber, means supporting said tape erasing means adjacent said take-up reel for progressively erasing said information on said tape as said tape is wound on said take-up reel and after said tape is diverted from said path into the recorder to permit one-time viewing of the prerecorded information on said tape prior to erasing the prerecorded information, and means for positioning said tape erasing means in an ineffective position after said tape is erased to permit reusing said cassette as a blank cassette.

2. A video tape cassette as defined in claim 1 wherein said positioning means comprise a latch element disposed for automatically engaging and retaining said tape erasing means in a retracted position in response to winding of said tape on said take-up reel.

3. A video cassette as defined in claim 1 wherein said positioning means include an element movable in response to movement of said tape erasing means.

4. A video tape cassette as defined in claim 1 wherein said tape erasing means comprise a magnetic element, movable means supporting said element for movement within said take-up reel and in contact with said tape, and means for retaining said magnetic element in a retracted position relative to said take-up reel to provide said positioning means.

5. A video tape cassette as defined in claim 4 wherein said movable means comprise a flexible spring-like arm having one end portion supporting said magnetic element within said take-up reel, and said arm has an opposite end portion connected to said housing and supporting said arm for movement within said take-up reel.

6. A video tape cassette as defined in claim 5 wherein said arm comprises a flexible spring-like strip of thin plastics material.

7. A video tape cassette adapted to be inserted into a videocassette recorder and to be removed from the recorder, said cassette comprising a housing defining a generally enclosed chamber, a supply reel and a take-up reel each having a hub portion and supported within said chamber for rotation on parallel spaced axes, a flexible magnetic tape having prerecorded information thereon, said tape being wound on said hub portion of said supply reel and having a leading end portion connected to said hub portion of said take-up reel, means supported by said housing for guiding said tape from said supply reel to said take-up reel and along a predetermined path which permits feeding of the prerecorded tape through a videocassette player to provide for clear viewing of the information, and an erasing element supported within said chamber adjacent said take-up reel for progressively erasing the prerecorded information on said tape as said tape is wound on said take-up reel for preventing a second clear viewing of said information on said tape as said tape is wound on said take-up reel and after said tape is diverted from said path into the recorder to permit one-time viewing of the prerecorded information on said tape.

8. A video tape cassette as defined in claim 7 wherein said housing comprises a disposable material, and a flexible label member adhesively mounted on said housing and covering said portion of said tape extending from said supply reel to said take-up reel.

9. A method of using a video tape cassette having a housing enclosing a supply reel and a take-up reel with a magnetic tape wound on the supply reel and extending to the take-up reel, comprising the steps of recording proprietary information on the magnetic tape, winding the prerecorded magnetic tape on the supply reel, feeding the prerecorded tape from the supply reel through a videocassette player and then winding the tape on the take-up reel to provide for clear viewing of the prerecorded information on the tape, and magnetically erasing the prerecorded information on the tape within the housing as the tape is wound on the take-up reel and immediately after the tape is fed through the videocassette player to prevent the information from being clearly viewed for a second time and to permit one-time viewing of the prerecorded information on the tape.

* * * * *